United States Patent [19]

Brückner et al.

[11] Patent Number: 4,974,411
[45] Date of Patent: Dec. 4, 1990

[54] SUPERCHARGED COAL-FIRED STEAM GENERATOR

[75] Inventors: Hermann Brückner, Uttenreuth; Lothar Stadie, Höchstadt; Gerhard Scholl, Spiesen-Elversberg, all of Fed. Rep. of Germany

[73] Assignees: Siemens Aktiengesellschaft, Munich; Saarbergwerke AG, Saarbrücken, both of Fed. Rep. of Germany

[21] Appl. No.: 407,250

[22] Filed: Sep. 14, 1989

Related U.S. Application Data

[63] Continuation-in-part of Ser. No. 136,110, Dec. 2, 1987, abandoned.

Foreign Application Priority Data

Dec. 22, 1986 [DE] Fed. Rep. of Germany ....... 3644030

[51] Int. Cl.$^5$ ................................................ F02C 6/18
[52] U.S. Cl. ................................ 60/39.12; 60/39.182; 122/4 D
[58] Field of Search .............. 60/39.12, 39.181, 39.182, 60/39.464, 746, 755; 122/4 D

[56] References Cited

U.S. PATENT DOCUMENTS

| | | | |
|---|---|---|---|
| 1,591,679 | 7/1926 | Howley | 60/39.464 |
| 2,398,654 | 4/1946 | Lubbock et al. | 60/755 |
| 3,139,726 | 7/1964 | Wilson et al. | 60/39.02 |
| 3,234,735 | 2/1966 | Pirsh et al. | 60/39.181 |
| 4,281,510 | 8/1981 | Borjesgard et al. | 60/39.464 |
| 4,424,766 | 1/1984 | Boyle | 122/4 D |
| 4,462,206 | 7/1984 | Aquet | 60/39.12 |

FOREIGN PATENT DOCUMENTS 3417445 11/1985 Fed. Rep. of Germany .

*Primary Examiner*—Louis J. Casaregola
*Attorney, Agent, or Firm*—Herbert L. Lerner; Laurence A. Greenberg

[57] ABSTRACT

A gas and steam turbine power plant has a gas turbine with a gas side, a waste heat steam generator having a steam side and being connected downstream of the gas side of the gas turbine, and a steam turbine connected to the steam side of the waste heat steam generator. A super-charged, coal-fired steam generator has an exhaust gas vent line connected to the gas turbine. The coal-fired steam generator includes at least one substoichiometrically operated fluidized bed furnace system, an integrated dust separator connected downstream of the at least one fluidized bed furnace system, and a steam generator slag tap or wet tap furnace having burners with a gas side connected downstream of the dust separator.

19 Claims, 1 Drawing Sheet

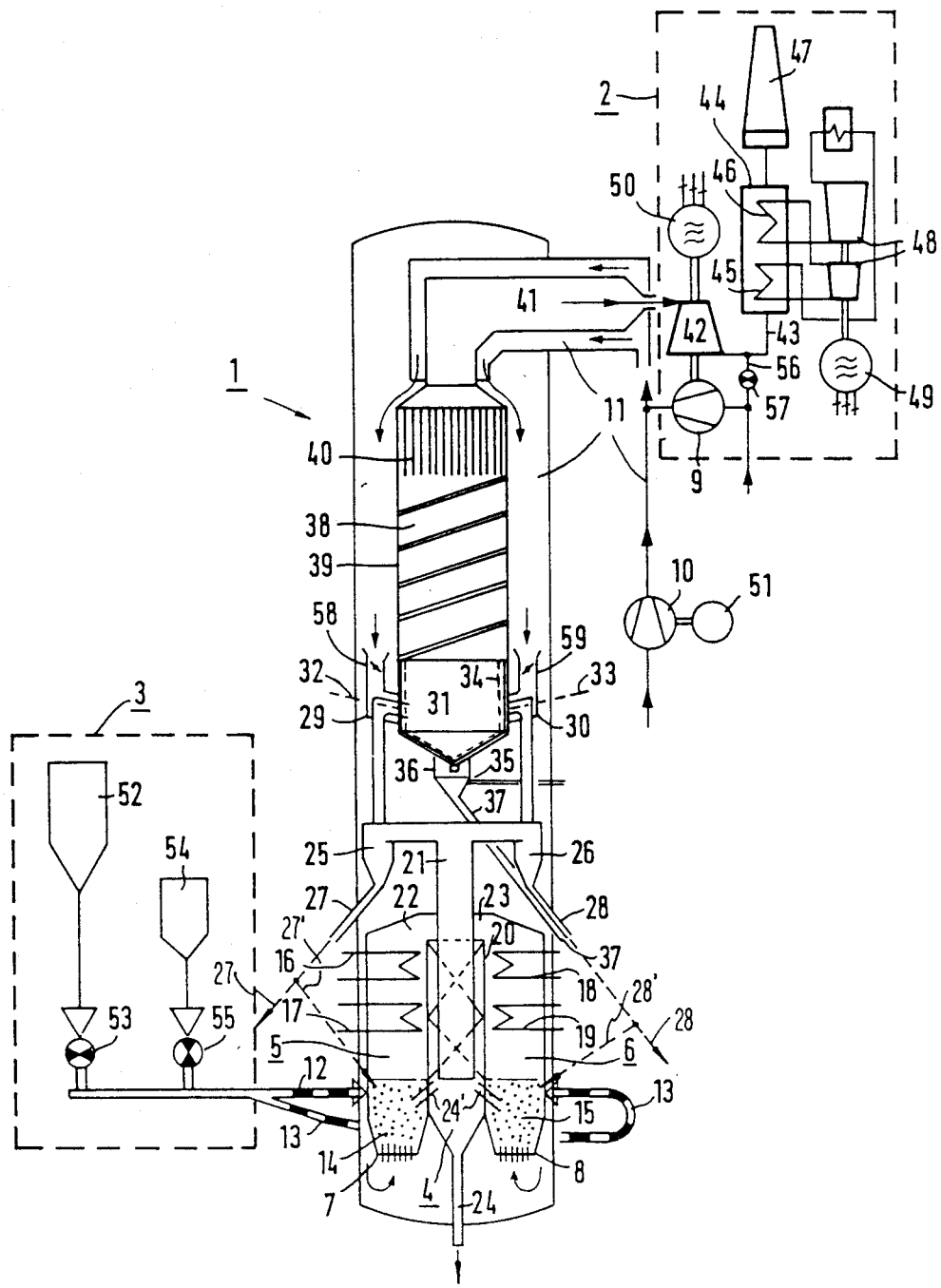

4,974,411

SUPERCHARGED COAL-FIRED STEAM GENERATOR

CROSS REFERENCE TO RELATED APPLICATION

This application is a continuation-in-part of application Ser. No. 136,110, filed Dec. 21, 1987, now abandoned.

BACKGROUND OF THE INVENTION

1. Field of the Invention

The invention relates to a supercharged coal-fired steam generator for a gas and steam turbine power plant, having a gas turbine connected to the exhaust line of the coal-fired steam generator, a waste heat steam generator connected downstream of the gas turbine on the gas side, and a steam turbine connected to the steam side of the waste heat steam generator.

2. Description of the Related Art

Gas and steam turbine power plants having a supercharged, coal-fired steam generator have already been proposed in various publications, such as German Published, Non-Prosecuted Patent Application No. DE-OS 31 23 391. That is because such a power plant structure promises high overall efficiency, and the capital investment is far below that needed for a gas and steam turbine power plant having coal gasifiers connected to the inlet side thereof. However, gas and steam turbine power plants having a supercharged coal-fired steam generator have not been previously developed past the experimental stage. On one hand, it has been found that the service life of the gas turbine is very severely shortened by the dust burden of the waste gases. On the other hand, sufficiently effective removal of dust from the exhaust gases is impossible with the high gas inlet temperatures that prevail at the inlet to the gas turbine.

SUMMARY OF THE INVENTION

It is accordingly an object of the invention to provide a super-charged, coal-fired steam generator, which overcomes the hereinafore-mentioned disadvantages of the heretoforeknown devices of this general type and which provides a way in which coal can be combusted in a sufficiently dust-free manner in a coal-fired steam generator, so that the exhaust gases in a gas turbine can perform work, without notably impairing the service life of the turbine. Furthermore, the combustion should proceed in such a way that the least possible amount of nitrogen oxides are formed, so as to meet emissions regulations.

With the foregoing and other objects in view there is provided, in accordance with the invention, in a gas and steam turbine power plant having a gas turbine with a gas side, a waste heat steam generator having a steam side and being connected downstream of the gas side of the gas turbine, and a steam turbine connected to the steam side of the waste heat steam generator, the improvement comprising a super-charged, coal-fired steam generator having an exhaust gas vent line connected to the gas turbine and including at least one substoichiometrically operated fluidized bed furnace system, an integrated dust separator connected downstream of the at least one fluidized bed furnace system, and a steam generator slag tap or wet tap furnace having burners with a gas side connected downstream of the dust separator.

Substoichiometric operation occurs when the content of air introduced into the fluidized bed furnace system over a given period of time provides less oxygen than is required for complete combustion of fuel introduced during the same period of time. This definition is more precise and different than merely stating that a fuel/air mixture is rich or lean. Even if an exact stoichiometric amount of oxygen is introduced into the furnace system, this would be inadequate for complete combustion of all of the fuel. In practice, complete combustion always requires more oxygen than the stoichiometrically required amount. The fuel is therefore not completely burned and gas emitted from the furnace system can be burned with additional air or oxygen. A reducing atmosphere therefore exists which produces less nitrogen oxides than during operation with surplus oxygen.

As mentioned above, the super-charged, coal-fired steam generator is assembled from a fluidized bed furnace system operated substoichiometrically, an integrated dust separator connected downstream of the fluidized bed furnace system, and a steam generator slag tap or wet tap furnace having burners with a gas side connected downstream of the dust separator. In this way, on one hand, provision is made for a low combustion temperature in the fluidized bed, so that the formation of nitrogen oxides is largely suppressed, and on the other hand, due to the permanent fluidization of the particles, complete combustion is nevertheless attained. At the same time, the dust particles entrained by the combustion gas formed in the fluidized bed furnace system are separated from the combustion gases in the integrated dust separator to the maximum possible extent, so that the burners of the steam generator slag tap or wet tap furnace are supplied with a virtually dust-free gas, substantially containing carbon monoxide. At the high temperatures, the ash particles that are nevertheless still entrained in the slag tap or wet tap furnace, melt and agglomerate into small droplets. The droplets drop downward due to gravity and can be removed in an ash removal line connected to the lower end of the steam generator slag tap or wet tap furnace. As a result of this entire operation, the exhaust gases that leave the steam generator slag tap or wet tap furnace are free of dust to the maximum possible extent.

In accordance with another feature of the invention, the steam generator slag tap or wet tap furnace has an inner wall with a surface and a cylindrical cross section. In accordance with a further feature of the invention, the burners of the steam generator slag tap or wet tap furnace are disposed at a tangent to the wall surface for reinforcing the separation of ash. In this way, the freedom from dust of the exhaust gases leaving the steam generator slag tap or wet tap furnace can be reduced even further. As a result, a rotational flow is induced in the slag tap or wet tap furnace, which transports the ash particles still contained in the combustion gas toward the wall of the steam generator slag tap or wet tap furnace. There the liquefied, sticky ashes can flow downward along the wall to the ash removal line. Due to the sticky consistency thereof, the ashes firmly hold all the particles they comes into contact with and thus considerably contribute to the cleaning of the exhaust gas.

In accordance with an added feature of the invention, there are provided further cyclones connected downstream of the dust separator and upstream of the burners of the steam generator slag tap or wet tap furnace, besides the integrated dust separator. Therefore, a further reduction in the input of ash into the ash slag tap or wet tap furnace can be attained.

In accordance with an additional feature of the invention, the steam generator slag tap or wet tap furnace has an exhaust gas side, and there is provided a radiation chamber connected downstream of the exhaust gas side of the steam generator slag tap or wet tap furnace. In accordance with yet another feature of the invention, the steam generator slag tap or wet tap furnace or wet bottom merges directly with the radiation chamber. In this way, the rotational flow in the ash slag tap or wet tap furnace, in combination with the removal of molten ash particles which have re-solidified by cooling in the radiation chamber, is even further improved over the long path thereof through the radiation chamber, and at the same time a transfer of the perceptible heat of the exhaust gases to the water vapor circulation loop at the least possible expense, is assured.

In accordance with yet a further feature of the invention, the radiation chamber has finned tube walls.

In accordance with yet an additional feature of the invention, there is provided a water vapor circulation loop connected to the steam generator, the radiation chamber having an outlet side and convection heating surfaces on the outlet side being connected to the water vapor circulation loop for heating water to produce steam.

In accordance with still another feature of the invention, the steam generator slag tap or wet tap furnace has a funnel-like bottom, and there is provided an ash removal line connected to the bottom.

In accordance with still a further feature of the invention, the funnel-like bottom of the steam generator slag tap or wet tap furnace has a lower end, and there is provided an ash collecting funnel having a water spray system and being disposed on the lower end.

In accordance with still an added feature of the invention, there are provided means for supplying the fluidized bed furnace system with coal and additives for desulfuration.

In accordance with still an additional feature of the invention, the supplying means includes means for admixing burned lime with coal.

In accordance with again another feature of the invention, the at least one fluidized bed furnace system is a stationary fluidized bed furnace system.

In accordance with again a further feature of the invention, there is provided a water vapor circulation loop connected to the steam generator, the stationary fluidized bed furnace system including a stationary fluidized bed, a gas chamber above the stationary fluidized bed, and heat exchanger heating surfaces in the gas chamber being connected to the water vapor circulation loop for heating water to produce steam.

In accordance with again an added feature of the invention, the stationary fluidized bed furnace system includes a plurality of stationary fluidized bed combustion chambers disposed concentrically around the integrated dust separator.

In accordance with again an additional feature of the invention, the at least one fluidized bed furnace system is a circulating fluidized bed furnace system.

In accordance with another feature of the invention, the at least one fluidized bed furnace system has a fluidized bed, and the integrated dust separator includes an ash removal line returning a portion of separated-out dust into the fluidized bed.

In accordance with a concomitant feature of the invention, there is provided a a fresh-air line surrounding the exhaust gas vent line in the form of a housing.

Other features which are considered as characteristic for the invention are set forth in the appended claims.

Although the invention is illustrated and described herein as embodied in a supercharged coal-fired steam generator, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

BRIEF DESCRIPTION OF THE DRAWING

The single FIGURE of the drawing is a diagrammatic longitudinal sectional and schematic view of a gas and steam turbine power plant having a supercharged coal-fired steam generator according to the invention.

DESCRIPTION OF THE PREFERRED EMBODIMENTS

Referring now to the FIGURE of the drawing in detail, there is seen a simplified longitudinal section of a supercharged coal-fired steam generator 1, a gas and steam turbine power plant 2 connected to the steam generator, as well as a coal preparation system 3 upstream of the supercharged steam generator 1. The lower portion of the supercharged coal-fired steam generator 1 contains two fluidized bed combustion chambers 5, 6 disposed on both sides of an ash separating cyclone or dust separator 4. The combustion chambers have nozzle bottoms 7, 8 being connected to a fresh-air line 11 that surrounds the components of the steam generator in housing-like fashion and is connected to an air compressor 9, 10. Respective fuel lines 12, 13 connected to the coal preparation system 3 discharge above the nozzle bottoms 7, 8 of each fluidized bed combustion chamber. Heat exchanger heating surfaces 16, 17, 18, 19 which are provided in an open space above respective stationary fluidized beds 14, 15 of the fluidized bed combustion chambers 5, 6, are connected to components a water vapor circulation loop of the gas and steam turbine power plant 2 through non-illustrated lines. The separating cyclone 4 between the two fluidized bed combustion chambers 5, 6 is substantially formed of two concentric pipes 20, 21. The otherwise closed upper end of the outer pipe 20 is connected to exhaust gas conduits 22, 23 of the two fluidized bed combustion chambers 5, 6, which discharge into the outer pipe 20 at a tangent thereto. The lower end of the outer pipe 20 discharges in funnel fashion into an ash removal line 24. The lower end of the inner pipe 21 is open. The inner pipe 21 plunges into the outer pipe 20 to a point shortly above the lower funnel-like end of the outer pipe 20. In the illustrated embodiment, the upper end of the inner pipe 21 discharges into two additional separating cyclones 25, 26 disposed on both sides of the upper end of the inner pipe 21.

The lower end of each separating cyclone 25, 26 is connected to a respective ash removal line 27, 28 and the exhaust gas side of the separating cyclones 25, 26 are connected to burners 29, 30 of a steam generator slag tap or wet tap furnace 31 disposed above the fluidized bed combustion chambers 5, 6. A slag tap or wet tap furnace is a furnace which has no structural parts therein, because the temperature of gases in the furnace is too high for metallic components. The exhaust gases from the fluidized bed furnace system which are introduced into the slag tap or wet tap furnace of the steam generator are still very hot and are additionally heated by burning in the burners 29, 30 with preheated air.

As indicated by arrows in the drawing, the ash removal lines 24, 27 and 28 may discharge outside the furnace system 5, 6, or return lines 27', 28' may return into the system. This is also true for the ash removal line 24 which has return lines 24'. If the air pressure in the return lines is increased, the furnace system becomes a circulating bed furnace system. It is thus clear that the system may be operated in such a way that the dust leaves the system or is fed back into the beds. Furthermore, the fluidized bed may become a circulating fluidized bed through the use of the return lines.

The burners 29, 30 are aligned at a tangent to the cylindrical inner wall of the steam generator slag tap or wet tap furnace 31 and the axes of symmetry 32, 33 thereof are inclined somewhat downward. The burners are connected to the fresh-air line 11. The inside of the steam generator slag tap or wet tap furnace 31 is lined with a fireclay lining 34 and the lower end thereof has a funnel-like shape. Adjoining the funnel-like end of the slag tap or wet tap furnace 31 is an ash collecting funnel 36 provided with a water spray system 35. The ash collecting funnel 36 in turn discharges into a further ash removal line 37. The steam generator slag tap or wet tap furnace 31 is adjoined by the lower end of a cylindrical radiation chamber 38. The radiation chamber is provided with a finned pipe wall 39 connected to the water vapor circulation loop of the gas and steam turbine power plant 2. The radiation chamber 38 has convection heating surfaces 40 on the upper end thereof, as well as an exhaust gas vent line 41.

The exhaust gas vent line 41 leaving the radiation chamber 38 is connected directly to a gas turbine 42 of the gas and steam turbine power plant 2. The exhaust gas line 43 of the gas turbine 42 leads through a waste heat boiler or steam generator 44 to a chimney 47. The waste heat boiler 44 has further heat exchanger heating surfaces 45, 46 connected to the water vapor circulation loop. The heat exchanger heating surfaces of the waste heat boiler are connected to the water vapor circulation loop of a steam turbine 48 through non-illustrated lines between the components. The steam turbine 48 and the gas turbine 42 each drive a respective generator 49, 50. Additionally, the gas turbine 42 also drives the air compressor 9. The other air compressor 10, is used for startup and in the case of a malfunction, is driven by an electric motor 51.

The coal preparation system 3 upstream of the supercharged, coal-fired steam generator 1 includes a coal hopper 52, a grinding mechanism 53 connected to the outlet side of the coal hopper, a hopper 54 for burned lime, and a metering device 55 for the burned lime, which is connected to the fuel line 12, 13.

During the operation of the gas and steam turbine power plant 2, coal is drawn from the coal hopper 52, ground, and mixed with lime from the hopper 54 which is added thereto in a metered fashion. This fuel mixture is introduced into the two fluidized bed combustion chambers or systems 5, 6 above the nozzle bottoms 7, 8, through the fuel lines 12, 13. At the same time, fresh air is aspirated through the air compressor 9 of the gas turbine 42, compressed, pushed through the fresh-air line 11 that surrounds the exhaust gas vent line 41 and the components 4, 5, 6, 25, 26, 31, 38 of the steam generator 1 in housing-like fashion, and pushed through the nozzles of the nozzle bottoms 7, 8 into the fluidized bed combustion chamber 5, 6. The pre-heated fresh air thus blown in makes the fuel particles in the stationary fluidized bed combustion chambers 5, 6 turbulent, and the fuel particles are substantially combusted to form water vapor and carbon monoxide because of the substoichiometric quantity of air. The temperature in the fluidized bed does not rise above 900° C. because of the substoichiometric combustion. The temperature can be regulated to a particular desired value between 750° C. and 850° C. by admixing exhaust gas with the fresh air, by means of a regulating valve 57 built into an auxiliary line 56. A portion of the heat of the fluidized bed combustion chambers 5, 6 can be given up to the water vapor circulation loop of the steam turbine 48 through the heat exchanger heating surfaces 16–19 that plunge into the open space above the respective stationary fluidized beds 14, 15 in the fluidized bed combustion chambers.

The combustion gases flow at a tangent from the fluidized bed combustion chambers 5, 6 through the exhaust gas conduits 22, 23 into the gap between the inner and outer pipes 20, 21 of the integrated ash separating cyclone 4, in which they generate a severe downwardly oriented rotational flow. The entrained ash particles flow due to centrifugal force along the wall of the outer pipe 20, downward into the funnel-like lower end thereof, and from there reach the ash removal line 24. The combustion gases, which are largely freed of dust, then rise through the inner pipe 21 of the separating cyclone 4 and in the illustrated embodiment, they are conducted into the additional separating cyclones 25 or 26 as well. The virtually dust-free combustion gas from the separating cyclones which are mutually connected in parallel, enters the burners 29, 30 which are disposed in the outer wall of the ash slag tap or wet tap furnace 31 at a tangent, where it is combusted with further fresh air from the fresh-air line 11. This fresh air flows from the fresh-air line to the two burners through regulating valves 58, 59.

Since the fresh-air line 11 is constructed as a jacket surrounding the exhaust gas vent line 41, the radiation chamber 38, the ash slag tap or wet tap furnace 31, the separating cyclones 4, 25, 26 and the fluidized bed combustion chambers 5, 6, the fresh air is already heated prior to its entry into the burners of the ash slag tap or wet tap furnace or into the nozzle bottoms of the fluidized bed combustion chamber. The advantage of this operation is that the fresh air which cools these components is itself being heated, and carries the heat farther on into the process. It is thus unnecessary to provide special heat insulation for these very hot components. Instead, it is sufficient for the outer wall of the fresh-air line, which is at a substantially lower temperature level, to be provided with a thermal insulation in order to minimize the heat losses of the steam generator 1. Furthermore, as a result of the gas pressure of the fresh air, which deviates only very slightly from the gas pressure in the fluidized bed combustion chambers and in the radiation chamber 38, the severely thermally burdened components are relieved in terms of pressure.

The temperature in the ash slag tap or wet tap furnace 31 is selected to be at such a point that any superfine ash particles that are entrained will melt, become turbulent and agglomerate in the rotational flow generated by the tangential disposition of the burners and will be carried to the fireclay outer wall of the ash slag tap or wet tap furnace. From there, the sticky-fluid ash flows downward into the funnel-like bottom of the ash slag tap or wet tap furnace, and from there drops as it solidifies through the water spray system 35 into the cooled ash collecting funnel 36, from where it is removed through the ash removal line 37. All of the particles carried to the inner wall of the ash slag tap or wet tap furnace remain suspended on the sticky ash flowing downward at that location and are removed along with this ash. This effect contributes heavily to cleaning of particles of all kinds from the exhaust gas.

The exhaust gases of the steam generator slag tap or wet tap furnace 31 flow through the radiation chamber 38 disposed above the steam generator slag tap or wet tap furnace, merge directly with it, and they give up their heat by radiation to the finned tube walls 39 of the radiation chamber. The gases flow through the convection heating surfaces 40 disposed at the upper end of the radiation chamber, where they give up further heat to the water vapor circulation loop of the steam turbine power plant and they flow through the exhaust gas vent line 41, which is cooled by the incoming fresh air, until they reach the gas turbine 42. The gas turbine drives the air compressor 9 and the generator 50. After leaving the gas turbine, the exhaust gases flow through the waste heat boiler 44, where they give up the perceptible heat thereof through the heat exchanger heating surfaces 45, 46 to the water vapor circulation loop of the steam turbine power plant, and finally escape into the chimney 47.

It is thus seen that a water vapor circulation loop of the steam turbine 48 in the gas and steam turbine power plant 2 has non-illustrated lines connected to components thereof, namely the heat exchanger heating surfaces 16–19, the finned pipe wall 39, the heat exchanger heating surfaces 45, 46 and the convection heating surfaces 40. Water in the lines is converted into steam in the heating surfaces.

It is a great advantage of this gas and steam turbine power plant 2 that not only can the high gas temperatures required for operating a gas turbine be attained without difficulty through the use of this supercharged steam generator, but that furthermore the exhaust gases thereof are so free of dust that the attainable service life of the gas turbine 42 is comparable with that attained when connected to the outlet side of coal gasification systems. Furthermore, it is a particular advantage of this supercharged, coal-fired steam generator that relatively few nitrogen oxides are produced. This is because as a result of the substoichiometric combustion in the fluidized beds 14, 15, only temperatures at which few nitrogen oxides are formed are involved, and because in addition the relatively highly reducing atmosphere counteracts the formation of nitrogen oxide. Relatively few nitrogen oxides are formed in the flames of the burners 29, 30 of the ash slag tap or wet tap furnace 31, because of the high proportion of carbon monoxide. Additionally, the use of a fluidized bed as the first combustion stage permits the metered addition of additives that bind sulfur compounds in the ash. As a result, relatively few sulfur oxides are contained in the exhaust gases. Finally, the supercharged, coal-fired steam generator, with the fluidized bed combustion chambers upstream thereof and the ash slag tap or wet tap furnace downstream thereof, is substantially more compact, space-saving and technologically less expensive than a gas and steam turbine system preceded by a coal gasification system. As a result of this latter property, there is also a pronounced economy in terms of capital investment. However, the coal-fired steam generator according to the invention can also be advantageously used in systems in which extremely dust-free exhaust gases are needed at the highest temperature level, such as in a tubular cracking furnace.

We claim:

1. In a gas and steam turbine power plant having a gas turbine with a gas side, a waste heat steam generator having a steam side and being connected downstream of the gas side of the gas turbine, and a steam turbine connected to the steam side of the waste heat steam generator, the improvement comprising a super-charged, coal-fired steam generator having an exhaust gas vent line connected to the gas turbine and including at least one substoichiometrically operated fluidized bed furnace system, an integrated dust separator connected downstream of said at least one fluidized bed furnace system, and a steam generator slag tap furnace having burners with a gas side connected downstream of said dust separator.

2. Super-charged, coal-fired steam generator according to claim 1, wherein said steam generator slag tap furnace has an inner wall with a surface and a cylindrical cross section.

3. Super-charged, coal-fired steam generator according to claim 2, wherein said burners of said steam generator slag tap furnace are disposed at a tangent to said wall surface for reinforcing the separation of ash.

4. Super-charged, coal-fired steam generator according to claim 1, including cyclones connected downstream of said dust separator and upstream of said burners of said steam generator slag tap furnace.

5. Super-charged, coal-fired steam generator according to claim 1, wherein said steam generator slag tap furnace has an exhaust gas side, and including a radiation chamber connected downstream of said exhaust gas side of said steam generator slag tap furnace.

6. Super-charged, coal-fired steam generator according to claim 5, wherein said steam generator slag tap furnace merges directly with said radiation chamber.

7. Super-charged, coal-fired steam generator according to claim 5, wherein said radiation chamber has finned tube walls.

8. Super-charged, coal-fired steam generator according to claim 5, including a water vapor circulation loop connected to said steam generator, said radiation chamber having an outlet side and convection heating surfaces on said outlet side being connected to said water vapor circulation loop for heating water to produce steam.

9. Super-charged, coal-fired steam generator according to claim 1, wherein said steam generator slag tap furnace has a funnel-like bottom, and including an ash removal line connected to said bottom.

10. Super-charged, coal-fired steam generator according to claim 9, wherein said funnel-like bottom of said steam generator slag tap furnace has a lower end, and including an ash collecting funnel having a water spray system and being disposed on said lower end.

11. Super-charged, coal-fired steam generator according to claim 1, including means for supplying said fluidized bed furnace system with coal and additives for desulfuration.

12. Super-charged, coal-fired steam generator according to claim 11, wherein said supplying means includes means for admixing burned lime with coal.

13. Super-charged, coal-fired steam generator according to claim 1, wherein said at least one fluidized bed furnace system is a stationary fluidized bed furnace system.

14. Super-charged, coal-fired steam generator according to claim 13, including a water vapor circulation loop connected to said steam generator, said stationary fluidized bed furnace system including a stationary fluidized bed, a gas chamber above said stationary fluidized bed, and heat exchanger heating surfaces in said gas chamber being connected to said water vapor circulation loop for heating water to produce steam.

15. Super-charged, coal-fired steam generator according to claim 13, wherein said stationary fluidized bed furnace system includes a plurality of stationary fluidized bed combustion chambers disposed concentrically around said integrated dust separator.

16. Super-charged, coal-fired steam generator according to claim 1, wherein said at least one fluidized bed furnace system is a circulating fluidized bed furnace system.

17. Super-charged, coal-fired steam generator according to claim 1, wherein said at least one fluidized bed furnace system has a fluidized bed, and said integrated dust separator includes an ash removal line returning a portion of separated-out dust into said fluidized bed.

18. Super-charged, coal-fired steam generator according to claim 1, including a fresh-air line surrounding said exhaust gas vent line in the form of a housing.

19. A super-charged coal-fired steam generator, comprising an exhaust gas vent line, at least one substoichiometrically operated fluidized bed furnace system, an integrated dust separator connected downstream of said at least one fluidized bed furnace system, and a steam generator slag tap furnace having burners with a gas side connected downstream of said dust separator.

* * * * *

UNITED STATES PATENT AND TRADEMARK OFFICE
CERTIFICATE OF CORRECTION

PATENT NO. : 4,974,411

DATED : Dec. 4, 1990

INVENTOR(S) : Brückner et al

It is certified that error appears in the above-identified patent and that said Letters Patent is hereby corrected as shown below:

In the Title Page, Item (63), Line 1,

"Dec. 2, 1987"

should read

- - Dec. 21, 1987 - -.

Signed and Sealed this

Twenty-third Day of June, 1992

Attest:

DOUGLAS B. COMER

Attesting Officer

Acting Commissioner of Patents and Trademarks